United States Patent
Lidian et al.

(10) Patent No.: US 9,137,071 B2
(45) Date of Patent: Sep. 15, 2015

(54) MIMO SYSTEM

(71) Applicant: Telefonaktiebolaget L M Ericsson (publ), Stockholm (SE)

(72) Inventors: Namir Lidian, Solna (SE); Anders Jonsson, Täby (SE); Sairamesh Nammi, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 171 days.

(21) Appl. No.: 13/879,950

(22) PCT Filed: Dec. 20, 2012

(86) PCT No.: PCT/SE2012/051454
§ 371 (c)(1),
(2) Date: Apr. 17, 2013

(87) PCT Pub. No.: WO2013/112092
PCT Pub. Date: Aug. 1, 2013

(65) Prior Publication Data
US 2014/0177526 A1    Jun. 26, 2014

Related U.S. Application Data

(60) Provisional application No. 61/590,865, filed on Jan. 26, 2012.

(51) Int. Cl.
*H04L 27/26* (2006.01)
*H04B 7/04* (2006.01)
*H04L 25/03* (2006.01)

(52) U.S. Cl.
CPC .......... *H04L 27/2601* (2013.01); *H04B 7/0486* (2013.01); *H04L 25/03949* (2013.01)

(58) Field of Classification Search
CPC .. H04B 7/0413; H04B 7/0486; H04L 1/1812; H04L 1/1887; H04L 25/3949; H04L 27/2601; H04L 69/324; H04L 25/3949
USPC ............... 370/310, 328, 329; 455/452.2, 509, 455/513, 69
See application file for complete search history.

(56) References Cited

U.S. PATENT DOCUMENTS

2008/0219195 A1 *   9/2008   Pani et al. ..................... 370/310

FOREIGN PATENT DOCUMENTS

EP         1947887       *   7/2008

OTHER PUBLICATIONS

3rd Generation Partnership Project. 3GPP TS 45.002 V10.3.0 (Mar. 2012). Technical Specification Group GSM/EDGE Radio Access Network; Multiplexing and multiple access on the radio path; (Release 10). Mar. 2012, pp. 1-112.

(Continued)

*Primary Examiner* — Xavier S. Wong
(74) *Attorney, Agent, or Firm* — Murphy, Bilak & Homiller, PLLC

(57) ABSTRACT

Improved performance of downlink data transmission in a high speed downlink packet access, HSDPA, mobile communication system is described. Rank information, RI, and channel quality information, CQI, is obtained in a radio base station from a user equipment, UE, and this rank and CQI information is used in a medium access control-ehs, MAC-ehs, entity for determining a transport format and resource combination, TFRC, on a downlink channel.

15 Claims, 3 Drawing Sheets

(56) References Cited

OTHER PUBLICATIONS

3rd Generation Partnership Project. "Discussion on 4-branch MIMO design options." 3GPP TSG-RAN WG1 Meeting #66bis, R1-112979, Oct. 10-14, 2011, pp. 1-3, Zhuhai, China.

3rd Generation Partnership Project. "Layer mapping for 4-branch MIMO." 3GPP TSG-RAN WG1 Meeting #67, R1-113847, Nov. 14-18, 2011, pp. 1-7, San Francisco, CA, USA.

3rd Generation Partnership Project. "4Tx MIMO layer, code word and transport block mapping." 3GPP TSG RAN WG1 Meeting #67, R1-114140, Nov. 14-18, 2011, pp. 1-2, San Francisco, CA, USA.

3rd Generation Partnership Project. "Number of supported codewords for 4-Branch MIMO." 3GPP TSG RAN WG1 Meeting #67, R1-114290, Nov. 14-18, 2011, pp. 1-8, San Francisco, CA, USA.

3rd Generation Partnership Project. 3GPP TS 25.308 V11.2.0 (Sep. 2012). 3rd Generation Partnership Project; Technical Specification Group Radio Access Network; High Speed Downlink Packet Access (HSDPA); Overall description; Stage 2 (Release 11). Sep. 2012, pp. 1-74.

3rd Generation Partnership Project. 3GPP TS 25.321 V11.2.0 (Sep. 2012). 3rd Generation Partnership Project; Technical Specification Group Radio Access Network; Medium Access Control (MAC) protocol specification (Release 11). Sep. 2012, pp. 1-198.

\* cited by examiner

MIMO SYSTEM

TECHNICAL FIELD

The field of the present disclosure is that of four branch multiple input-multiple output, MIMO, transmission in a high-speed downlink packet access, HSDPA, mobile communication system.

BACKGROUND

Current work within the third generation partnership project, 3GPP, regarding HSPA evolution include addition of several new features in order to meet the requirements set by the International Mobile Telecommunications Advanced, IMT-A. For example, this work is documented in 3GPP TS 25.321 (v.11.2.0) and 3GPP TS 25.308 (v.11.2.0). The main objective of the new features is to increase the average spectral efficiency. One possible technique for improving downlink spectral efficiency would be to introduce support for four-branch MIMO, i.e. utilize up to four transmit and receive antennas, to enhance the spatial multiplexing gains and to offer improved beam forming capabilities.

Four-branch MIMO, which is sometimes also referred to as four-stream or four-layer MIMO, provides up to 84 Mbps per 5 MHz carrier for high signal to noise ratio, SNR, users and improves the coverage for low SNR users. Four-branch MIMO supports simultaneous transmission of up to four streams or layers on the downlink to a given UE. The HS-DSCH is thus modified to support up to four transport blocks per transmission time interval, TTI, where each transport block represents one stream or layer. In effect, this means that up to four transport blocks may be simultaneously transmitted on the downlink shared data channel.

Currently the maximum transport block, TB, size is 42192 bits. But in order to attain 336 Mbps on four carriers with a four branch MIMO, each carrier has to transmit data at a rate of 84 Mbps.

One fundamental issue with a four branch MIMO system is how many codewords such a MIMO system should support. It was decided to use two codewords for this system. i.e. two codewords are mapped to four layers or antennas. This is because the performance of four branch MIMO with two codewords is almost equal to that of four codewords while being easier to implement and define in 3GPP standard.

When two codewords are mapped to four antennas, a proper mechanism is needed to map the transport blocks from upper layers to the physical layer. For example, when a user equipment, UE, reports rank 1 and NodeB decides to choose rank 1 transmission, the physical layer is expecting only one transport block, while if the rank is 2 and NodeB is scheduling with rank 2, the physical layer is expecting two transport blocks. For these two ranks, the transport blocks are mapped to the layers with one to one mapping. However, for higher ranks, this approach can not be used because of the restriction to use only two codewords for the four branch MIMO system.

SUMMARY

In order to mitigate at least some of the drawbacks as discussed above, there is provided in a first aspect a method for improving performance of downlink data transmission in a mobile communication system. The method comprises obtaining rank information, RI, from a user equipment, UE, and using this rank information for determining a transport format and resource combination, TFRC, on a downlink channel.

More specifically, according to the first aspect there is provided a method in a radio base station, the radio base station being configured to participate in high speed downlink packet access, HSDPA, multiple input multiple output, MIMO, operation wherein data is communicated to a user equipment, UE, via the radio base station. The method comprises:

receiving, from a radio network controller, medium access control-d, MAC-d, protocol data units, PDUs, receiving, from the UE, at least two channel quality indicator, CQI, values and a rank information, RI, value, determining, in case the RI value is at least 3, a transport format and resource combination, TFRC, for transmission of a first medium access control-enhanced high speed, MAC-ehs, PDU, a second MAC-ehs PDU and at least one additional MAC-ehs PDU to the UE during a transmission time interval, TTI, such that the TFRC specifies a size of the at least one additional MAC-ehs PDU to be identical to a size of any of the first MAC-ehs PDU and the second MAC-ehs PDU, and transmitting the MAC-d PDUs in MAC-ehs PDUs according to the determined TFRC to the UE in a high speed downlink shared channel, HS-DSCH.

Embodiments include those where the determination of the TFRC is such that, in case the RI value is 3, the TFRC specifies a size of a third MAC-ehs PDU to be identical to the size of the second MAC-ehs PDU. Other embodiments include those where the determination of the TFRC is such that, in case the RI value is 4, the TFRC specifies a size of a third MAC-ehs PDU to be identical to the size of the first MAC-ehs PDU, and the TFRC specifies a size of a fourth MAC-ehs PDU to be identical to the size of the second MAC-ehs PDU.

Some embodiments are such that the size of the first and second MAC-ehs PDUs are determined based on the CQI values and based on a total transmission power level that is available for the HS-DSCH. For example, the size of the first MAC-ehs PDU can be determined based on a first of the at least two CQI values and based on a first part of the total transmission power level that is available for the HS-DSCH, and the size of the second MAC-ehs PDU can be determined based on a second of the at least two CQI values and based on a second part of the total transmission power level that is available for the HS-DSCH, said second part being the total transmission power level that is available for the HS-DSCH minus the first part of the total transmission power level that is available for the HS-DSCH.

Embodiments include those where the radio base station is configured to maintain at least a first and a second hybrid automatic repeat request, HARQ, process for the HS-DSCH, and wherein, in case the RI value is 3, the first HARQ process handles the first MAC-ehs PDU and the second MAC-ehs PDU, and the second HARQ process handles the third MAC-ehs PDU. Other embodiments include those where the radio base station is configured to maintain at least a first and a second HARQ process for the HS-DSCH, and wherein, in case the RI value is 4, the first HARQ process handles the first MAC-ehs PDU and the second MAC-ehs PDU, and the second HARQ process handles the third MAC-ehs PDU and the fourth MAC-ehs PDU.

In a second aspect there is provided a network entity comprising processing and communication circuitry configured to obtain rank information, RI, from a user equipment, UE, and using this rank information for determining a transport format and resource combination, TFRC, on a downlink channel.

More specifically, according to the second aspect there is provided a radio base station, the radio base station being configured to participate in high speed downlink packet access, HSDPA, multiple input multiple output, MIMO, operation wherein data is communicated to a user equipment, UE, via the radio base station. The radio base station comprises digital data communication and processing circuitry that is adapted to:
  receive, from a radio network controller, medium access control-d, MAC-d, protocol data units, PDUs,
  receive, from the UE, at least two channel quality indicator, CQI, values and a rank information, RI, value,
  determine, in case the RI value is at least 3, a transport format and resource combination, TFRC, for transmission of a first medium access control-enhanced high speed, MAC-ehs, PDU, a second MAC-ehs PDU and at least one additional MAC-ehs PDU to the UE during a transmission time interval, TTI, such that the TFRC specifies a size of the at least one additional MAC-ehs PDU to be identical to a size of any of the first MAC-ehs PDU and the second MAC-ehs PDU, and
  transmit the MAC-d PDUs in MAC-ehs PDUs according to the determined TFRC to the UE in a high speed downlink shared channel, HS-DSCH.

In some embodiments of the base station, the digital data communication and processing circuitry is adapted to determine the TFRC such that, in case the RI value is 3, the TFRC specifies a size of a third MAC-ehs PDU to be identical to the size of the second MAC-ehs PDU. In other embodiments, the digital data communication and processing circuitry is adapted to determine the TFRC such that, in case the RI value is 4, the TFRC specifies a size of a third MAC-ehs PDU to be identical to the size of the first MAC-ehs PDU, and the TFRC specifies a size of a fourth MAC-ehs PDU to be identical to the size of the second MAC-ehs PDU.

The digital data communication and processing circuitry can, in some embodiments be adapted such that the size of the first and second MAC-ehs PDUs are determined based on the CQI values and based on a total transmission power level that is available for the HS-DSCH. For example, the digital data communication and processing circuitry can be adapted such that the size of the first MAC-ehs PDU is determined based on a first of the at least two CQI values and based on a first part of the total transmission power level that is available for the HS-DSCH, and such that the size of the second MAC-ehs PDU is determined based on a second of the at least two CQI values and based on a second part of the total transmission power level that is available for the HS-DSCH, said second part being the total transmission power level that is available for the HS-DSCH minus the first part of the total transmission power level that is available for the HS-DSCH.

In some embodiments of the base station, the digital data communication and processing circuitry is adapted to maintain at least a first and a second hybrid automatic repeat request, HARQ, process for the HS-DSCH, and wherein, in case the RI value is 3, the first HARQ process handles the first MAC-ehs PDU and the second MAC-ehs PDU, and the second HARQ process handles the third MAC-ehs PDU. In other embodiments, the digital data communication and processing circuitry is adapted to maintain at least a first and a second hybrid automatic repeat request, HARQ, process for the HS-DSCH, and wherein, in case the RI value is 4, the first HARQ process handles the first MAC-ehs PDU and the second MAC-ehs PDU, and the second HARQ process handles the third MAC-ehs PDU and the fourth MAC-ehs PDU.

In a third aspect there is provided a non-transitory computer program product comprising software instructions that are configured to, when executed in a processor, perform the method as summarized above in connection with the first aspect.

Embodiments of the methods, radio base stations and computer programs as summarized above are advantageous, for example, in that they provides a simple mechanism for choosing two transport blocks for a two codeword MIMO in a Four branch MIMO system.

DETAILED DESCRIPTION

Figure 1:
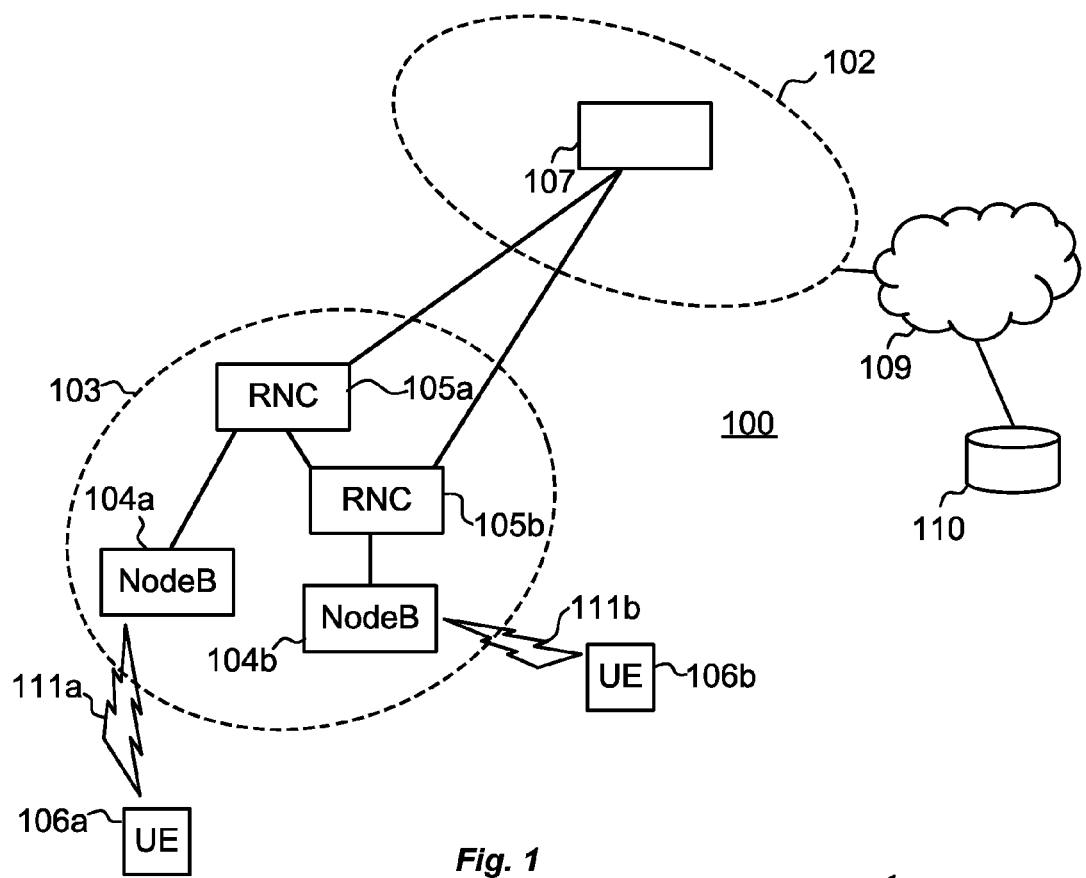
FIG. 1 illustrates schematically a mobile communication system.

FIG. 1 illustrates schematically a universal mobile telecommunications system, UMTS, network 100 in which the present methods and apparatuses can be implemented. It should be noted, however, that the skilled person will readily be able to perform implementations in other similar communication systems involving transmission of coded data between nodes.

In FIG. 1 the UMTS network 100 comprises a core network 102 and a UMTS terrestrial radio access network, UTRAN, 103. The UTRAN 103 comprises a number of nodes in the form of radio network controllers, RNC, 105a, 105b, each of which is coupled to a set of neighbouring nodes in the form of one or more NodeB 104a, 104b. Each NodeB 104 is responsible for a given geographical radio cell and the controlling RNC 105 is responsible for routing user and signalling data between that Node B 104 and the core network 102. All of the RNC's 105 are coupled to one another. It is to be noted that the expression radio base station is synonymous with the expression Node B. A general outline of the UTRAN 103 is given in 3GPP technical specification TS 25.401 V3.2.0.

FIG. 1 also illustrates communicating entities in the form of mobile devices or user equipment, UE, 106a, 106b connected to a respective NodeB 104a, 104b in the UTRAN 103 via a respective air interface 111a, 111b. Mobile devices served by one Node B, such as UE 106a served by NodeB 104a, are located in a so-called radio cell and can communicate with the UTRAN 103 using protocols as specified by 3GPP HSDPA specifications and MIMO as will be discussed in further detail below.

The core network 102 comprises a number of nodes represented by node 107 and provides communication services to the UE 106 via the UTRAN 103, for example when communicating with the Internet 109 where, schematically, a server 110 illustrates an entity with which the mobile devices 106 may communicate. As the skilled person realizes, the network 100 in FIG. 1 may comprise a large number of similar functional units in the core network 102 and the UTRAN 103, and in typical realizations of networks, the number of mobile devices may be very large.

Figure 2A:
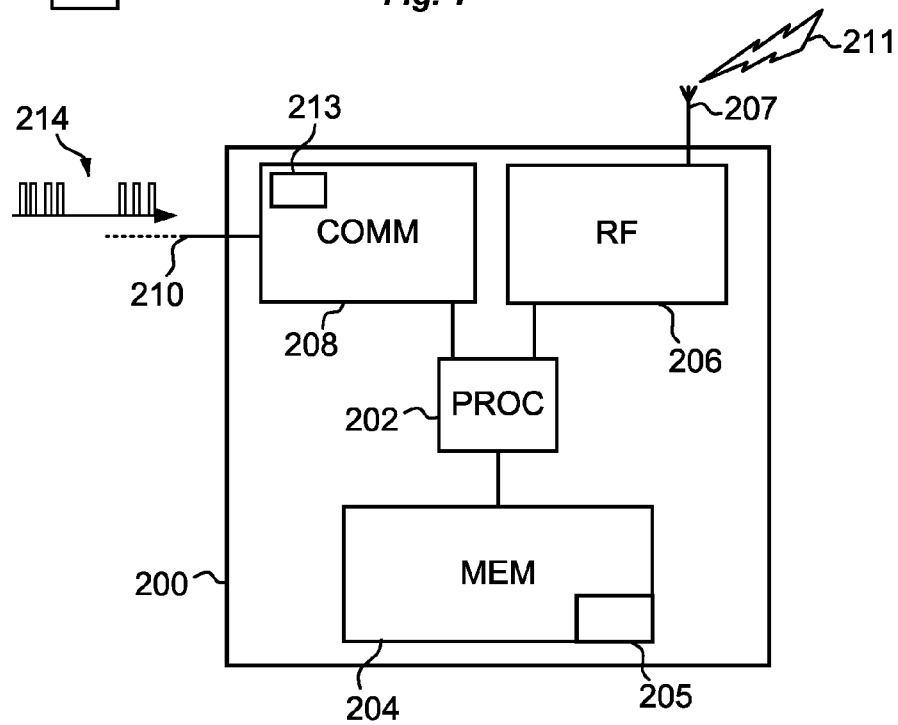
FIG. 2a illustrates schematically a radio base station.

FIG. 2a is a functional block diagram that schematically illustrates a radio base station, RBS, in the form of a Node B 200, corresponding to any of the Node Bs 104 in FIG. 1. The radio base station 200 comprises a processor 202, a memory 204, radio frequency, RF, receiving and transmitting circuitry 206 and an antenna 207. Communication circuitry 208 includes a receiver 213 capable of receiving data 214 from other entities in the network such as a radio network controller 105. Radio communication takes place in an air interface 211 via the antenna 207 and is realized by the RF circuitry 206 controlled by the processor 202, as the skilled person will understand. The circuitry of these means 202, 204, 206 and 208 can comprise and/or form part of one or more application specific integrated circuit, ASIC, as well as one or more digital signal processor, DSP. The processor 202 makes use of software instructions 205 stored in the memory 204 in order to control functions of the radio base station 200, including the functions to be described in detail below with regard to handling of PDUs. In other words, at least the communication circuitry 208, RF circuitry 206, the processor 202 and the memory 204 form parts of digital data processing and communication circuitry that is configured to handle PDUs as summarized above and described in detail below. For example, the digital data processing and communication circuitry comprises a medium access control-enhanced high speed, MAC-ehs entity. The MAC-ehs entity, which will be described in detail below in connection with FIG. 2b, operates so as to facilitate multiplexing of data from multiple priority queues and to support higher downlink transmission rates.

Further details regarding how the units 202, 204, 206, 208 in the radio base station 200 operate in order to perform normal functions within a communication system, such as the system 100 of FIG. 1, are outside the scope of the present disclosure and are therefore not discussed further.

Figure 2B:
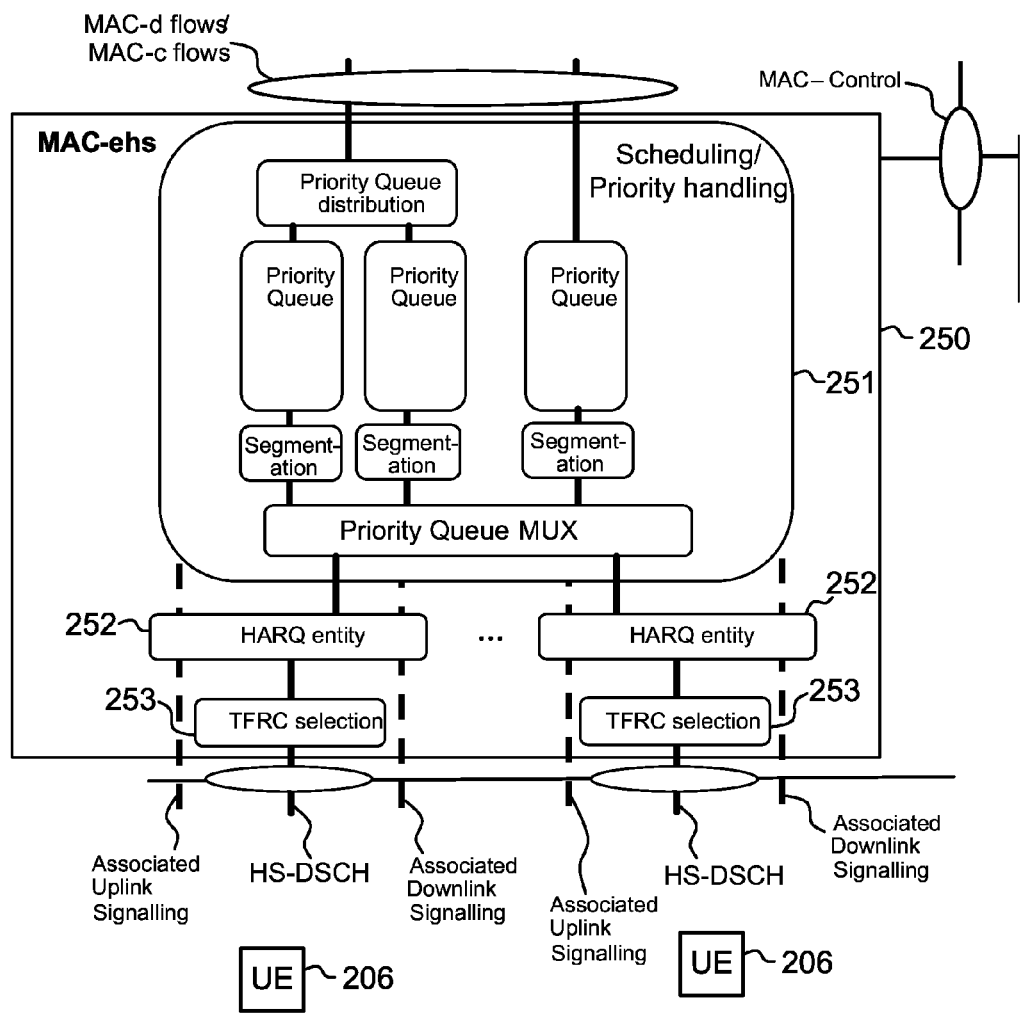
FIG. 2b illustrates schematically a medium access control, MAC, entity in a radio base station.

Turning now to FIG. 2b and with continued reference to FIGS. 1 and 2a, a medium access control-ehs, MAC-ehs, entity 250 in a radio network node, such as any of the radio base stations or NodeB's 104 in FIG. 1 or the radio base station 200 in FIG. 2a, will be described.

Before going into details regarding the specific functions of the MAC-ehs entity 250, it is to be noted that when taking part in two codeword-four branch MIMO system, an UE 206 sends the channel state information through a feedback channel on an uplink to the network. The feedback information typically comprises Rank Information, RI, Channel Quality Information, CQI, and the Precoding control Index, PCI. For a four branch MIMO system RI consist of two bits. The UE 206 sends the feedback information almost every TTI, although it can be configured to have a different value. The RI informs the network what type of rank transmission that the UE 206 would like to receive. After receiving RI from the UE 206, the network interprets and acts upon the RI. For example, the network can interpret the RI as follows:

RI=00 for Rank1,
RI=01 for Rank2,
RI=10 for Rank3,
RI=11 for Rank4.

As indicated in FIG. 2b, the MAC-ehs entity 250 is responsible for handling the data transmitted to an UE 206 on the configured high-speed downlink shared channel, HS-DSCH channel. There is one MAC-ehs entity in the UTRAN 103 for each cell that supports HS-DSCH transmission (noting, as is known to the skilled person, that a radio base station can server several cells and comprise several MAC-ehs entities). The same MAC-ehs entity may support HS-DSCH transmission in more than one cell served by the same NodeB/radio base station. There can be priority handling per MAC-ehs service data unit, SDU, in the MAC-ehs. The MAC-ehs is comprised of different functional entities, as described in section 4.2.4.6 in 3GPP TS 25.321. However, for the sake of clarity, only the entities that are affected by the present disclosure are described in detail below. That is, a scheduling and priority handling function 251, several hybrid automatic repeat request, HARQ, entities 252 and several transport format and resource combination, TFRC, selection entities 253

The scheduling/Priority Handling function 251:

The MAC-ehs entity comprises a scheduling/priority handling function 251 (also denoted scheduler). This function manages HS-DSCH resources between HARQ entities 252 and data flows according to their priority class. The scheduler 251 determines for each transmission time interval, TTI, if rank 1 or 2 should be used in case of two branch MIMO or in case of Four branch MIMO if the rank 1, 2, 3 or 4 should be used. Based on status reports from associated uplink signalling either new transmission or retransmission is determined when the UE 206 is operating in CELL_DCH state. In frequency division duplex, FDD, when the UE 206 is operating in CELL_FACH, CELL_PCH and URA_PCH state HS-DSCH reception, the MAC-ehs can perform retransmission without uplink signalling. Further, the scheduler 251 sets the logical channel identifiers for each new reordering SDU and transmission sequence numbers, TSN, for each new reordering protocol data unit, PDU, being serviced. To maintain proper transmission priority a new transmission can be initiated on a HARQ process at any time. The TSN is unique to each MAC-ehs Queue ID within a HS-DSCH. In FDD, it is not permitted to schedule new transmissions, including retransmissions originating in the radio link control, RLC, layer, along with retransmissions originating from the HARQ layer within the same TTI over the same HS-DSCH, and HARQ process.

The HARQ entities 252:

The MAC-ehs entity 250 comprises a plurality of hybrid automatic repeat request, HARQ, entities 252. One HARQ entity handles the hybrid ARQ functionality for one user and per high speed downlink shared channel, HS-DSCH, transport channel (frequency division duplex, FDD only). One, i.e. each, HARQ entity 252 is capable of supporting multiple instances (HARQ process) of stop and wait HARQ protocols. There shall be one HARQ entity 252 per HS-DSCH, one HARQ process per HS-DSCH per TTI for single stream transmission (if RI is set to 1) and two HARQ processes per HS-DSCH per TTI for dual stream transmission (if RI is set to Rank2, Rank3 or Rank 4).

For Rank 2, 3 and 4 transmissions, the transport block, TB, created by transport format and resource combination, TFRC, selection are placed in either of the two corresponding HARQ processes.

Thus for the rank 3 example in the TFRC selection section below, the first and second MAC-ehs PDU's are handled by one of the HARQ processes while the third MAC-ehs PDU is handled by the second HARQ process.

For the rank 4 example in the TFRC selection section below, the first and second MAC-ehs PDU's are handled by one of the HARQ processes while the third and fourth MAC-ehs PDU's are handled by the second HARQ process.

The TFRC selection entities 253:

The MAC-ehs entity 250 comprises a plurality of TFRC selection entities 253. This function selects an appropriate transport format and resource for the data to be transmitted in the downlink on HS-DSCH.

As mentioned above, the UE 206 informs the network, NW, (for example the radio base stations 104 in network 103 as well as the radio base station 200 illustrated in FIG. 2a) what type of rank transmission it is ready to receive. However, it is up to the NW to decide if to transmit on the same rank that the UE 206 informs or to go for another rank transmission, i.e. the NW may in case of rank 2, decide to transmit either rank1 or rank2 and in case UE 206 indicated rank 3 or rank 4 the NW may decide to use another rank, and because the UE 206 need to know the RI decided by the NW, the NW signals the "new" decided RI to the UE 206 on HS-SCCH in case if the NW change the rank type informed by the UE. The Transport Block size sent to the UE is indicated in the Transport Format Resource Indicator, TFRI, value signalled on the HS-SCCH, if RI sets to 1 then only one TFRI value is signalled on HS-SCCH, if RI sets to rank 2, rank 3 or rank 4 then two TFRI's are signalled on HS-SCCH.

The TFRC selection process for rank 1 and rank 2 is handled according to existing solutions for two branch MIMO, and will therefore not be discussed in further detail here. However, rank 3 and rank 4 for four branch MIMO requires new handling as outlined below. In the examples below the rank is as selected by NW and not necessarily as indicated by the UE 206.

If rank 3 is indicated by the UE 206 and used by NW then in total 3 MAC-ehs PDU's are created based on the available HS-DSCH transmission power and the CQI information. One of the CQI values together with a part of the HS-DSCH transmission power available is used to determine the size of the first MAC-ehs PDU while the other CQI together with the remaining transmission power is used to determine the size of the second MAC-ehs PDU. However, since in this case rank 3 is used, then the NW shall create a third MAC-ehs PDU which is identical in size to the second MAC-ehs PDU.

If rank 4 is indicated by UE 206 and used by NW then a total of 4 MAC-ehs PDU's are created based on the available HS-DSCH transmission power and the CQI information. One of the CQI values together with a part of the HS-DSCH transmission power available is used to determine the size of the first MAC-ehs PDU while the other CQI together with the remaining transmission power is used to determine the size of the second MAC-ehs PDU. However, since in this case rank 4 is used, the NW shall create a third MAC-ehs PDU which is identical in size to the first MAC-ehs PDU and a fourth MAC-ehs PDU which is identical in size to the second MAC-ehs PDU.

Note that all MAC-ehs PDU's created shall each have a different TSN and will contain different data that is selected according to legacy priority handling.

Figure 3:
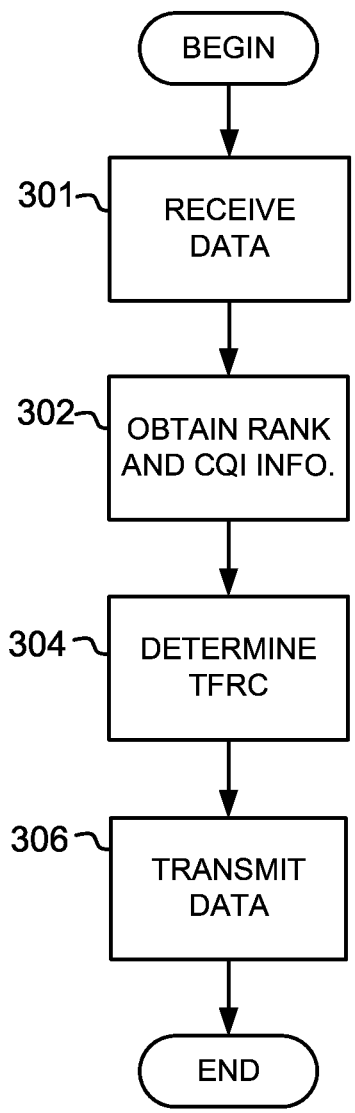
FIG. 3 is a flowchart of a method in a MAC entity.

The above functionality can be expressed in an embodiment of a method in a radio base station as illustrated in FIG. 3. The radio base station is configured to participate in HSDPA MIMO operation wherein data is communicated to an UE. In a reception step 301, MAC-d PDU's are received from a radio network controller. In an obtaining step 302 rank information is obtained, i.e. received, together with at least two CQI values, e.g. from an UE, and the obtained rank and CQI information is used, in a determination step 304, to determine and select an appropriate transport format and resource combination, TFRC, for the data to be transmitted. In case the RI value is at least 3, a transport format and resource combination, TFRC, is determined for transmission of a first MAC-ehs PDU, a second MAC-ehs PDU and at least one additional MAC-ehs PDU to the UE during a TTI such that the TFRC specifies a size of the at least one additional MAC-ehs PDU to be identical to a size of any of the first MAC-ehs PDU and the second MAC-ehs PDU.

Data, in the form of MAC-d PDU's, is then transmitted in a transmission step 306 according to the determined TFRC, via the downlink channel HS-DSCH, to the UE that has provided the rank and CQI information.

Although the described solutions may be implemented in any appropriate type of telecommunication system supporting any suitable communication standards and using any suitable components, particular embodiments of the described solutions may be implemented in any suitable network.

The invention claimed is:

1. A method in a radio base station, said radio base station configured to participate in high speed downlink packet access (HSDPA) multiple input multiple output (MIMO) operation wherein data is communicated to a user equipment (UE) via the radio base station, the method comprising:
   receiving, from a radio network controller, medium access control-d (MAC-d) protocol data units (PDUs);
   receiving, from the UE, at least two channel quality indicator (CQI) values and a rank information (RI) value;
   determining, in case the RI value is at least three, a transport format and resource combination (TFRC) for transmission of a first medium access control-enhanced high speed (MAC-ehs) PDU, a second MAC-ehs PDU and at least one additional MAC-ehs PDU to the UE during a transmission time interval (TTI) such that the TFRC specifies a size of the at least one additional MAC-ehs PDU to be identical to a size of any of the first MAC-ehs PDU and the second MAC-ehs PDU; and
   transmitting the MAC-d PDUs in MAC-ehs PDUs according to the determined TFRC to the UE in a high speed downlink shared channel (HS-DSCH).

2. The method according to claim 1, wherein the determination of the TFRC is such that, in case the RI value is three, the TFRC specifies a size of a third MAC-ehs PDU to be identical to the size of the second MAC-ehs PDU.

3. The method according to claim 1, wherein the determination of the TFRC is such that, in case the RI value is four, the TFRC specifies a size of a third MAC-ehs PDU to be identical to the size of the first MAC-ehs PDU, and the TFRC specifies a size of a fourth MAC-ehs PDU to be identical to the size of the second MAC-ehs PDU.

4. The method according to claim 1, wherein the size of the first and second MAC-ehs PDUs are determined based on the CQI values and based on a total transmission power level that is available for the HS-DSCH.

5. The method according to claim 4, wherein:
   the size of the first MAC-ehs PDU is determined based on a first of the at least two CQI values and based on a first part of the total transmission power level that is available for the HS-DSCH, and
   the size of the second MAC-ehs PDU is determined based on a second of the at least two CQI values and based on a second part of the total transmission power level that is available for the HS-DSCH, said second part being the total transmission power level that is available for the HS-DSCH minus the first part of the total transmission power level that is available for the HS-DSCH.

6. The method according to claim 1, where the radio base station is configured to maintain at least a first and a second hybrid automatic repeat request (HARQ) process for the HS-DSCH, and wherein, in case the RI value is three:
   the first HARQ process handles the first MAC-ehs PDU and the second MAC-ehs PDU; and
   the second HARQ process handles the third MAC-ehs PDU.

7. The method according to claim 1, where the radio base station is configured to maintain at least a first and a second HARQ process for the HS-DSCH, and wherein, in case the RI value is four:
   the first HARQ process handles the first MAC-ehs PDU and the second MAC-ehs PDU, and
   the second HARQ process handles the third MAC-ehs PDU and the fourth MAC-ehs PDU.

8. A radio base station, said radio base station configured to participate in high speed downlink packet access (HSDPA) multiple input multiple output (MIMO) operation wherein data is communicated to a user equipment (UE) via the radio base station, the radio base station comprising digital data communication and processing circuitry adapted to:

receive, from a radio network controller, medium access control-d (MAC-d) protocol data units (PDUs);

receive, from the UE, at least two channel quality indicator (CQI) values and a rank information (RI) value;

determine, in case the RI value is at least three, a transport format and resource combination (TFRC) for transmission of a first medium access control-enhanced high speed (MAC-ehs) PDU, a second MAC-ehs PDU and at least one additional MAC-ehs PDU to the UE during a transmission time interval (TTI) such that the TFRC specifies a size of the at least one additional MAC-ehs PDU to be identical to a size of any of the first MAC-ehs PDU and the second MAC-ehs PDU; and transmit the MAC-d PDUs in MAC-ehs PDUs according to the determined TFRC to the UE in a high speed downlink shared channel (HS-DSCH).

9. The radio base station according to claim 8, where the digital data communication and processing circuitry is adapted to determine the TFRC such that, in case the RI value is three, the TFRC specifies a size of a third MAC-ehs PDU to be identical to the size of the second MAC-ehs PDU.

10. The radio base station according to claim 8, where the digital data communication and processing circuitry is adapted to determine the TFRC such that, in case the RI value is four, the TFRC specifies a size of a third MAC-ehs PDU to be identical to the size of the first MAC-ehs PDU, and the TFRC specifies a size of a fourth MAC-ehs PDU to be identical to the size of the second MAC-ehs PDU.

11. The radio base station according to claim 8, where the digital data communication and processing circuitry is adapted such that the size of the first and second MAC-ehs PDUs are determined based on the CQI values and based on a total transmission power level that is available for the HS-DSCH.

12. The radio base station according to claim 11, where the digital data communication and processing circuitry is adapted such that:

the size of the first MAC-ehs PDU is determined based on a first of the at least two CQI values and based on a first part of the total transmission power level that is available for the HS-DSCH; and the size of the second MAC-ehs PDU is determined based on a second of the at least two CQI values and based on a second part of the total transmission power level that is available for the HS-DSCH, said second part being the total transmission power level that is available for the HS-DSCH minus the first part of the total transmission power level that is available for the HS-DSCH.

13. The radio base station according to claim 8, where the digital data communication and processing circuitry is adapted to maintain at least a first and a second hybrid automatic repeat request (HARQ) process for the HS-DSCH, and wherein, in case the RI value is three:

the first HARQ process handles the first MAC-ehs PDU and the second MAC-ehs PDU; and the second HARQ process handles the third MAC-ehs PDU.

14. The radio base station according to claim 8, where the digital data communication and processing circuitry is adapted to maintain at least a first and a second hybrid automatic repeat request (HARQ) process for the HS-DSCH, and wherein, in case the RI value is four:

the first HARQ process handles the first MAC-ehs PDU and the second MAC-ehs PDU; and the second HARQ process handles the third MAC-ehs PDU and the fourth MAC-ehs PDU.

15. A non-transitory computer readable medium storing a computer program product comprising software instructions that, when executed by a processor in a radio base station that is configured to participate in high speed downlink packet access (HSDPA) multiple input multiple output (MIMO) operation wherein data is communicated to a user equipment (UE) via the radio base station, configure the processor to:

receive, from a radio network controller, medium access control-d (MAC-d) protocol data units (PDUs);

receive, from the UE, at least two channel quality indicator (CQI) values and a rank information (RI) value;

determine, in case the RI value is at least three, a transport format and resource combination (TFRC) for transmission of a first medium access control-enhanced high speed (MAC-ehs) PDU, a second MAC-ehs PDU and at least one additional MAC-ehs PDU to the UE during a transmission time interval (TTI) such that the TFRC specifies a size of the at least one additional MAC-ehs PDU to be identical to a size of any of the first MAC-ehs PDU and the second MAC-ehs PDU; and transmit the MAC-d PDUs in MAC-ehs PDUs according to the determined TFRC to the UE in a high speed downlink shared channel (HS-DSCH).

* * * * *